Sept. 11, 1923.  1,467,855
G. JOHNSTON
MACHINE FOR CENTRIFUGALLY SEPARATING SOLIDS FROM LIQUIDS
Filed March 2, 1923  2 Sheets-Sheet 1

INVENTOR:-
GEORGE JOHNSTON
by his Attorneys
Howson and Howson

Patented Sept. 11, 1923.

1,467,855

UNITED STATES PATENT OFFICE.

GEORGE JOHNSTON, OF MANCHESTER, ENGLAND.

MACHINE FOR CENTRIFUGALLY SEPARATING SOLIDS FROM LIQUIDS.

Application filed March 2, 1923. Serial No. 622,348.

*To all whom it may concern:*

Be it known that I, GEORGE JOHNSTON, a British subject, and a resident of Manchester, England, engineer, have invented certain new and useful Improvements in Machines for Centrifugally Separating Solids from Liquids, of which the following is the specification.

The invention has for its object to provide in connection with centrifugal machines for the separation of solids from liquids, an improved device for the automatic and periodic discharge of the solids, of a lower specific gravity than the liquid portion of the mixture.

The devices may be applied to centrifugal machines of various known, or other, types in which the solid matter is collected in a certain zone and is adapted to control the discharge of the solid matter from that zone.

A device made according to the invention consists essentially of a casing guided radially in the plane of rotation of the machine, communicating at its inner end with that part of the centrifugal machine wherein the solid matters collect by way of flexible or other means permitting of its free or substantially free radial movement and coacting at its outer end with a stationary valve member (that is to say, a valve member fixed relatively to the centrifugal machine) in suchwise that as the casing moves radially outwards communication past the valve is opened and vice versa.

The casing is operatively connected to a centrifugal mass, the moment of which in respect to the casing is such that it more than balances the mass and its possible content, but is overbalanced (and therefore permits the casing to move radially outwards) when it, the casing, becomes filled to a determinate extent with solid matter (adjustment of the mass or its position being provided for this purpose). When this condition is established, the casing moves radially outwards, opening the valve device and discharging the solid matter. When the solid matter is substantially discharged, opposite conditions are established and the casing moves radially inwards, closing the valve.

A number of these devices are arranged about the periphery of the centrifugal machine which may be of any convenient type and may rotate either about a vertical or a horizontal axis at preferably a comparatively low speed.

Figure 1:
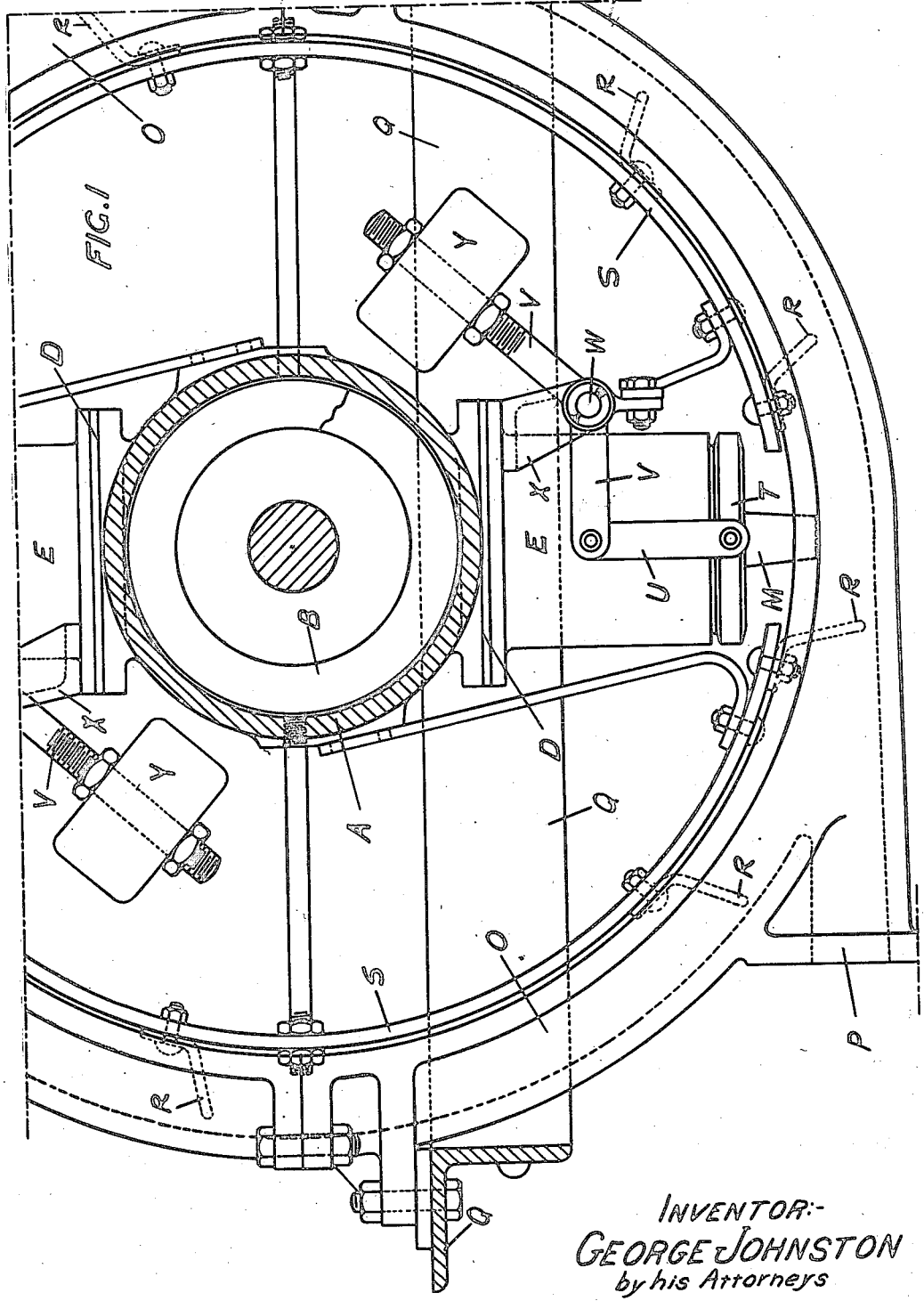
Figure 2:
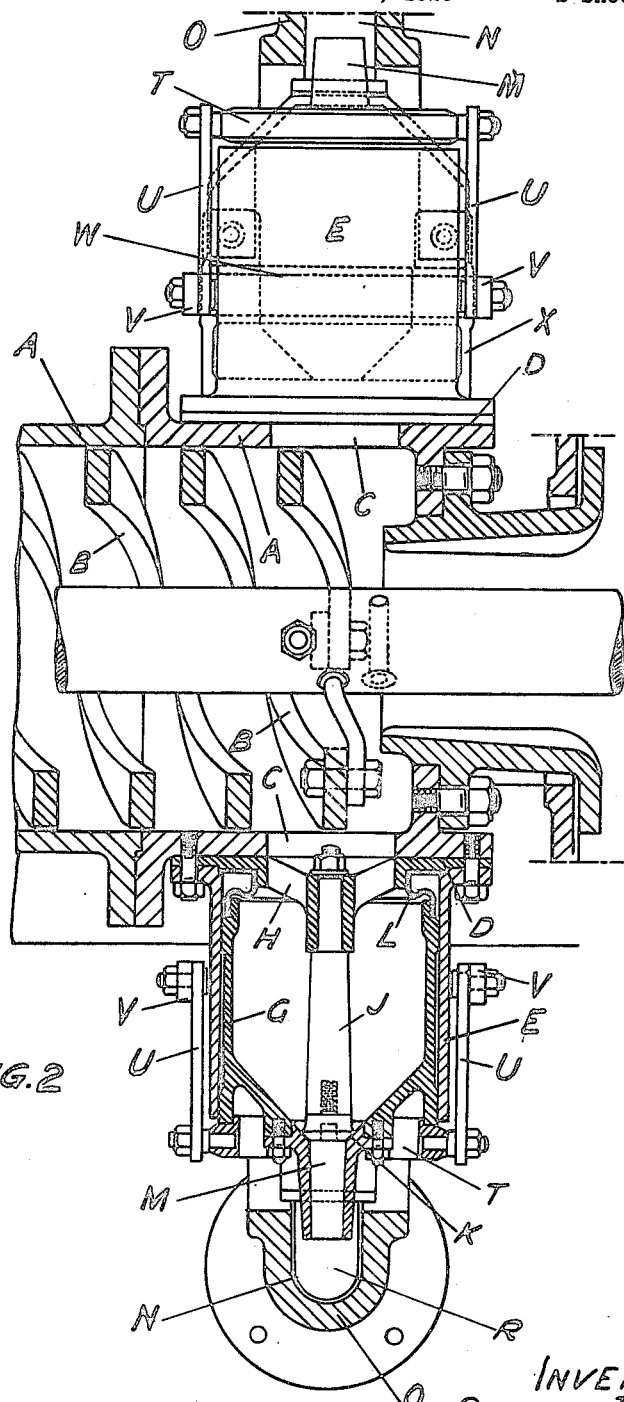

Two accompanying sheets of explanatory drawings are hereunto appended in which Figure 1, Sheet 1, is an elevation and Figure 2, Sheet 2, is a transverse section of a part of a centrifugal machine sufficient to show an example of the invention.

In this example, the centrifugal machine is of the type in which there is a rotating casing A within which is a helix B rotating at a different speed from the casing A and acting to convey the solid contents to delivery apertures C.

The casing A has two circular facings D formed on its exterior situated diametrically opposite to one another. Supported by the facings D are cylindrical guides E which are each provided with a cylindrical casing G free to slide therein. Concentric with the circular facing D is the circular delivery aperture C communicating with the interior of the machine casing A and having fixed at the mouth of it a spider H whose axis coincides with that of the guide E and casing G and which is securely held in place between the facing D and the guide E.

Supported by the spider H is a valve-member J which coacts with a seat K in the outer and conical reduced end of the moving casing G.

A flexible annular diaphragm L connects the moving casing G to the spider H and while permitting of movement effectually prevents the escape of the contents of the machine casing A.

The moving casing G is provided with a nozzle M which projects into and moves round in an annular channel N formed in a circular casing O concentric with the machine casing A and provided with an outlet P. The circular casing O is supported by a framing Q which carries the whole machine.

For the purpose of keeping the channel N clear, there is provided a series of scrapers R attached to a ring S of flat section supported by and rotating with the machine casing A.

The action of the moving casing G is controlled by a muff T connected by two links U with a forked lever V pivoted on a pin W carried by a bracket X fixed at the base of the guide E. The end of the lever V is screwed and carries a weight Y which may be adjusted upon it and fixed in any desired position.

The action of the machine is as follows:—
The solid matters in the mixture contained in the centrifugal machine casing A are collected in the cylindrical casings G (two of which are shown but of which there may be any number) communicating with it. The machine casing A, and with it the casings G are rotated at a certain speed and, considering one unit only, so long as the centrifugal force acting on the weight Y, whose moment in respect to the moving casing G more than balances the mass of the casing and its contents, the valve J will remain closed. Should, however, the contents of the casing G exceed a determinate amount, the casing G will be forced outwards and the valve J will leave its seat K thus allowing the contents to escape through the nozzle M into the channel N of the circular casing O from which they are finally expelled by the scrapers R through the outlet P.

As soon as the action of the weight Y is able to overcome that of the casing G and its contents, the casing will be moved inwards through the medium of the lever V, the links U, and the muff T thus closing the valve J and stopping the discharge of the solid matter.

What I claim is:—

1. A device for controlling the discharge of solids from centrifugal machines of the type set forth consisting of a casing guided radially in the plane of rotation of the machine, means permitting of communication between the inner end of the casing and that part of the centrifugal machine wherein the solid matters collect and of substantially free radial movement of the casing, a stationary valve member with which the outer end of the casing coacts, and a centrifugal mass controlling the casing, as set forth.

2. In a machine for centrifugally separating solids from liquids a rotating machine casing, circular facings on the exterior of the casing, delivery apertures therein, cylindrical guides exterior to and surrounding the apertures, cylindrical casings free to slide radially in the guides, valve members with which the outer ends of the radially moving casings coact and a centrifugal mass controlling the movement of each radially moving casing, as set forth.

3. In a machine for centrifugally separating solids from liquids, a rotating machine casing, a casing movable radially in the plane of rotation of the machine, an aperture giving communication between the two casings, a spider the axis of which coincides with that of the radial casing and connected to the machine casing, a flexible diaphragm connecting the radial casing to the spider, a valve member carried by the spider, a seat in the outer end of the radial casing with which the valve coacts, and a centrifugal mass controlling the movement of the radial casing as set forth.

4. In a machine for centrifugally separating solids from liquids, a rotating casing and a radially moving casing, means for giving communication between the two casings and for carrying and flexibly supporting the radial casing, a relatively stationary valve member within the radial casing, a discharge nozzle in the outer end of the radial cylinder coacting with the valve, a muff on the radial cylinder, an adjustably weighted lever and links connecting the muff with the weighted lever, as set forth.

In testimony whereof I have signed my name to this specification.

GEORGE JOHNSTON.